US007061144B2

(12) United States Patent
Sugiyama et al.

(10) Patent No.: US 7,061,144 B2
(45) Date of Patent: Jun. 13, 2006

(54) FUEL INJECTION VALVE HAVING INTERNAL PIPE

(75) Inventors: Koichi Sugiyama, Nagoya (JP); Shinsuke Yamamoto, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/066,263

(22) Filed: Feb. 28, 2005

(65) Prior Publication Data

US 2005/0194842 A1 Sep. 8, 2005

(30) Foreign Application Priority Data

Mar. 3, 2004 (JP) ............................. 2004-058699
Dec. 8, 2004 (JP) ............................. 2004-355639

(51) Int. Cl.
*H02K 41/00* (2006.01)

(52) U.S. Cl. ........................ 310/12; 310/15; 239/585.1

(58) Field of Classification Search ............ 310/12–15, 310/89; 239/585.1

See application file for complete search history.

(56) References Cited

U.S. PATENT DOCUMENTS

| | | | | |
|---|---|---|---|---|
| 4,946,107 | A | 8/1990 | Hunt | 239/585 |
| 5,769,391 | A | 6/1998 | Noller et al. | 251/129.21 |
| 6,216,665 | B1 * | 4/2001 | Okamoto et al. | 123/305 |
| 6,341,592 | B1 * | 1/2002 | Okamoto et al. | 123/305 |
| 2002/0088880 | A1 * | 7/2002 | Okamoto et al. | 239/585.1 |
| 2005/0098665 | A1 * | 5/2005 | Fukutomi | 239/585.1 |

* cited by examiner

*Primary Examiner*—Thanh Lam
(74) *Attorney, Agent, or Firm*—Nixon & Vanderhye P.C.

(57) ABSTRACT

A pipe member of a fuel injection valve includes a magnetic pipe and a non-magnetic pipe in this order from the side of a jet nozzle plate. The non-magnetic pipe extends to the end of the fuel injection valve 10 opposed to the jet nozzle plate, and the non-magnetic pipe is formed with a fuel inlet. The non-magnetic pipe has the thickness of not less than 0.2 mm but not more than 1.0 mm. An end of the non-magnetic pipe on the side of the magnetic pipe is positioned on the side of a moving core relative to a facing portion of a fixed core that faces to the moving core, and on the side of the fixed core relative to a second end of a yoke connected to the magnetic pipe. The non-magnetic pipe covers the outer periphery of a gap defined between the moving core and the fixed core.

12 Claims, 7 Drawing Sheets

FUEL INJECTION VALVE HAVING INTERNAL PIPE

CROSS REFERENCE TO RELATED APPLICATIONS

This application is based on and incorporates herein by reference Japanese Patent Applications No. 2004-58699 filed on Mar. 3, 2004 and No. 2004-355639 filed on Dec. 8, 2004.

FIELD OF THE INVENTION

The present invention relates to a fuel injection valve for an internal combustion engine.

BACKGROUND OF THE INVENTION

Conventionally, as disclosed in U.S. Pat. No. 4,946,107 and JP-A-11-500509 (U.S. Pat. No. 5,769,391), a fuel injection valve has a fixed core that is mounted on the opposite side of a jet nozzle with respect to a moving core. The fixed core is opposed to the moving core to form a magnetic circuit with the moving core. The fixed core extends toward a fuel inlet to form a fuel passage. However, in this construction, the fixed core extends in the axial direction, and manufacture of the fixed core is difficult.

A fuel injection valve may have a pipe member that is separate from a fixed core to cover the outer peripheries of both a moving core and a fixed core to form a fuel passage.

For example, a fuel injection valve 200 shown in FIG. 7 includes a pipe member 202 that covers both the outer peripheries of a moving core 212 and a fixed core 214. The moving core 212 reciprocates with a valve member 210. The fixed core 214 is mounted on the opposite side of the valve member 210 with respect to the moving core 212. The pipe member 202 includes a first magnetic pipe 203, a non-magnetic pipe 204, and a second magnetic pipe 205 in this order from the side of the moving core 212. The first magnetic pipe 203 and the non-magnetic pipe 204 are joined together by welding or the like, and the non-magnetic pipe 204 and the second magnetic pipe 205 are joined together by welding or the like. The non-magnetic pipe 204 is mounted in a manner to cover the outer periphery of a gap 216 formed between the moving core 212 and the fixed core 214 to prevent magnetic flux from short-circuiting between the first magnetic pipe 203 and the second magnetic pipe 205. The first yoke 230 and the second yoke 232 cover the outer periphery of a coil 220 mounted on the outer periphery of the pipe member 202. Both the yokes are connected magnetically to each other. The first yoke 230 is connected magnetically to the first magnetic pipe 203, and the second yoke 232 is connected magnetically to the second magnetic pipe 205.

However, the pipe member 202 is axially constructed of three members, that is, the first magnetic pipe 203, the non-magnetic pipe 204, and the second magnetic pipe 205. The pipe member 202 extends over the locations, in which the pipe member 202 connects to both the first yoke 230 and the second yoke 232. As a result, parts of the pipe member 202 are increased in number. Besides, joint portions, in which the parts of the pipe member 202 are joined together, are increased. Accordingly, manufacture of the pipe member 202 becomes difficult.

Besides, both the magnetic members constructed of the first magnetic pipe 203 and the second magnetic pipe 205 may cover both the outer peripheries of the moving core 212 and the fixed core 214 as shown in FIG. 7. In this structure, the area of the magnetic portions, which cover the outer peripheries of the moving core 212 and the fixed core 214, are increased. Therefore, magnetic flux, which flows among the coil 220, the moving core 212 and the fixed core 214 through the first magnetic pipe 203 and the second magnetic pipe 205, is increased. That is, magnetic flux flowing through the gap 216 between the moving core 212 and the fixed core 214 is decreased. As a result, force of magnetic attraction may be reduced. Besides, magnetic portions, which cover both the outer peripheries of the moving core 212 and the fixed core 214, are increased. Accordingly, rising and falling responsiveness of the force of magnetic attraction may be degraded when electric current supplied to the coil 220 is made ON and OFF. Thus, valve opening and closing responsiveness may be degraded. This is the same also with the case where the whole pipe member 202 is formed from a magnetic material.

Conversely, when the whole pipe member 202 is formed of a non-magnetic material, the valve-opening responsiveness may be degraded because magnetic resistance becomes large and the force of magnetic attraction is reduced.

SUMMARY OF THE INVENTION

In view of the foregoing problems, it is an object of the present invention to provide a fuel injection valve, in which two members including a magnetic pipe and a non-magnetic pipe form a pipe member that is located between connections, in which the pipe member connects to both axial ends of a yoke, manufacture of the pipe member is made easy, and the valve opening and closing responsiveness is high.

According to the present invention, a fuel injection valve includes a valve member, a moving core, a fixed core, a pipe member, a coil, and a yoke.

The valve member defines a jet nozzle through which fuel is intermittently injected. The moving core reciprocates with the valve member. The fixed core is mounted on the opposite side of the jet nozzle with respect to the moving core. The fixed core faces to the moving core to generate force of magnetic attraction between the fixed core and the moving core. The pipe member covers both the outer periphery of the moving core and the outer periphery of the fixed core. The pipe member includes a magnetic pipe and a non-magnetic pipe. The non-magnetic pipe is located on one of both sides of the magnetic pipe in the axial direction of the magnetic pipe. The non-magnetic pipe is joined to the magnetic pipe. The coil is mounted on the outer periphery of the pipe member to generate force of magnetic attraction between the moving core and the fixed core by energizing. The yoke covers the outer periphery of the coil.

The yoke defines a first axial end that is connected to the non-magnetic pipe. The yoke defines a second axial end that is connected to the magnetic pipe.

The fixed core and the moving core define a gap therebetween. The non-magnetic pipe covers the outer periphery of the gap. The non-magnetic pipe has an end on the side of the magnetic pipe. The end of the non-magnetic pipe on the side of the magnetic pipe is positioned on the side of the moving core with respect to a portion of the fixed core, the portion of the fixed core facing to the moving core. The end of the non-magnetic pipe on the side of the magnetic pipe is positioned axially on the side of the fixed core with respect to one of the first axial end of the yoke and the second end of the yoke, the one of the first axial end of the yoke and the second end of the yoke positioned on the side of the moving core.

The magnetic pipe is mounted on the side of the moving core. The non-magnetic pipe is mounted on the side of the fixed core.

The yoke defines a first connection area in which the yoke is connected to the non-magnetic pipe. The yoke defines a second connection area in which the yoke is connected to the magnetic pipe. The first connection area is greater than the first connection area. The first axial end of the yoke defines the first connection area between the yoke and the non-magnetic pipe in the radial direction of the yoke. The second axial end of the yoke defines the second connection area between the yoke and the magnetic pipe in the radial direction of the yoke. The first axial end of the yoke extends along the outer peripheral surface of the non-magnetic pipe in the axial direction of the non-magnetic pipe.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS (First Embodiment)

Figure 1:
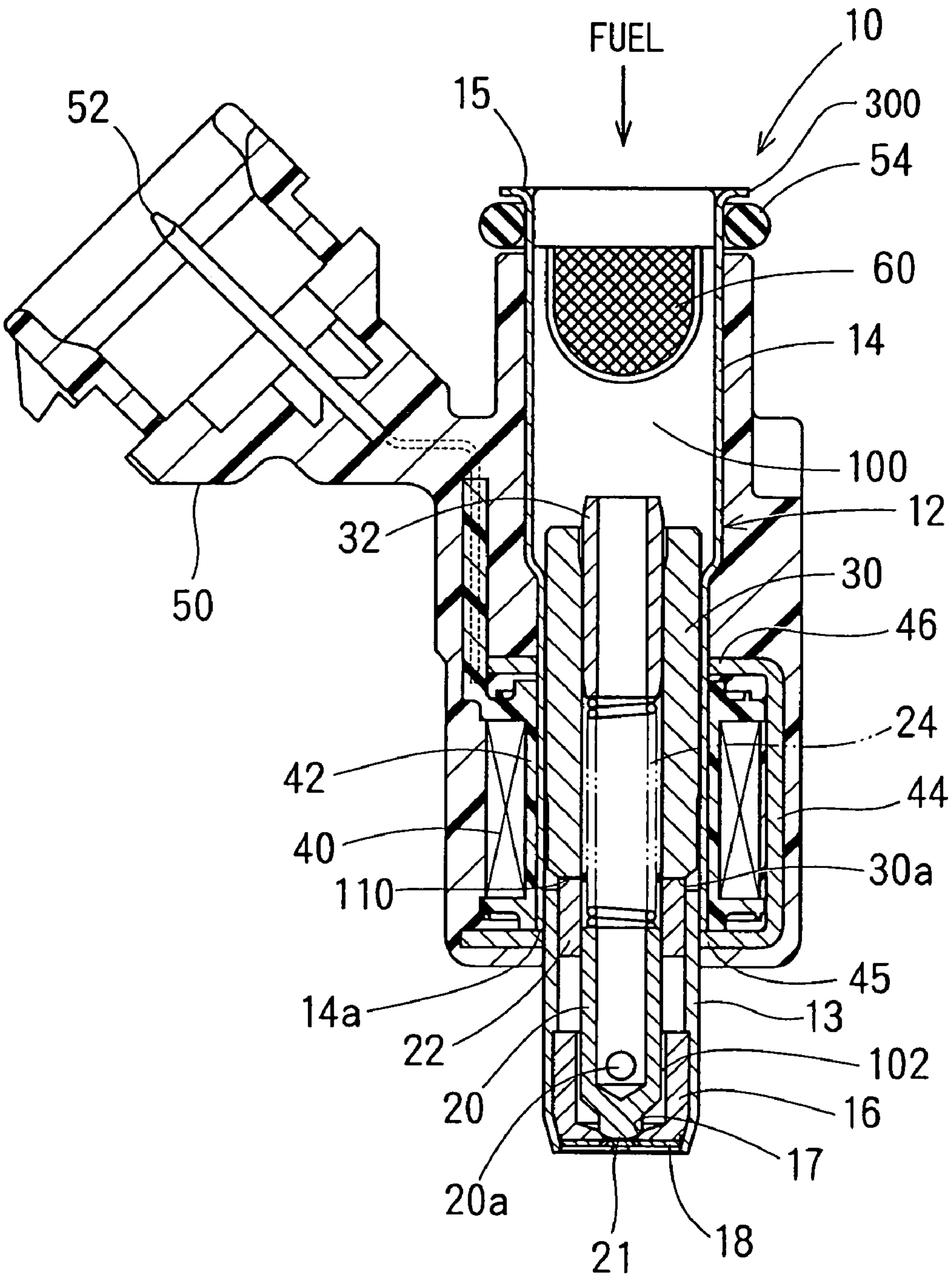
FIG. 1 is a cross sectional view showing a fuel injection valve according to a first embodiment of the present invention.

As shown in FIG. 1, a fuel injection valve 10 is mounted on an intake pipe that is connected to a combustion chamber of a gasoline engine to jet fuel into intake air flowing through an intake passage defined by the intake pipe, for example. In addition, the fuel injection valve 10 may be applied to direct-injection type gasoline engine that jets fuel directly into a combustion chamber of a gasoline engine, and may be also applied to diesel engines.

A pipe member 12 of the fuel injection valve 10 includes a magnetic pipe 13 and a non-magnetic pipe 14 in this order from the side of a jet nozzle plate 18 formed with a jet nozzle or nozzles. The non-magnetic pipe 14 is fitted onto the outer periphery of the magnetic pipe 13 to overlap the magnetic pipe 13 in the axial direction. The magnetic pipe 13 and the non-magnetic pipe 14 are joined together at a location, in which the magnetic pipe 13 and the non-magnetic pipe 14 overlap, by welding or the like. The magnetic pipe 13 and the non-magnetic pipe 14 are formed integrally without any joint from one axial end to the other axial end.

The magnetic pipe 13 accommodates a valve body 16 inside the inner peripheral wall of the end that is opposed to the non-magnetic pipe 14. The magnetic pipe 13 is fixed to the valve body 16 by welding or the like. A valve seat 17 is formed on the inner peripheral wall of the valve body 16. A contact portion 21 of a valve member 20 can be seated on the valve seat 17. The jet nozzle plate 18 is joined to the outer wall of the bottom of the valve body 16 by welding or the like. The jet nozzle plate 18 is formed with a single or multiple jet nozzles, through which fuel is jetted.

The non-magnetic pipe 14 extends to the end of the fuel injection valve 10 on the opposite side of the jet nozzle plate 18. The non-magnetic pipe 14 is formed with a fuel inlet 15. A fuel filter 60 is mounted on the inner peripheral wall of the non-magnetic pipe 14 on the side of the fuel inlet 15. The fuel filter 60 serves to remove foreign matters contained in fuel flowing into a fuel passage 100 from the fuel inlet 15. An O-ring 54 serving as a sealing member is fitted onto the outer peripheral wall of the non-magnetic pipe 14 on the side of the fuel inlet 15. An opening end of the non-magnetic pipe 14, which defines the fuel inlet 15, is bent to extend radially outward to make a latch 300 that prevents the O-ring 54 from coming off the non-magnetic pipe 14. The non-magnetic pipe 14 is set to have a thickness that is equal to or greater than 0.2 mm and is equal to or less than 1.0 mm. By setting the thickness of the non-magnetic pipe 14 to 1 mm or less, the non-magnetic pipe 14 interposed between a yoke 44 and a fixed core 30 is made as small as possible in magnetic resistance, so that magnetic flux for generation of required force of magnetic attraction can be caused to flow. Besides, by setting the thickness of the non-magnetic pipe 14 to 0.2 mm or more, the non-magnetic pipe 14 can be manufactured to be thin-walled.

The yoke 44 has a first end (first axial end) 46, which contacts to the non-magnetic pipe 14, and a second end (second axial end) 45, which contacts to the magnetic pipe 13. An end 14*a* of the non-magnetic pipe 14 on the side of the magnetic pipe 13 is positioned on the side of a moving core 22 relative to a facing portion 30*a* of the fixed core 30 that faces to the moving core 22. Besides, the end 14*a* of the non-magnetic pipe 14 on the side of the magnetic pipe 13 is positioned on the side of the fixed core 30 relative to the second end 45, on which the yoke 44 is connected to the magnetic pipe 13. That is, the end 14*a* of the non-magnetic pipe 14 is positioned between the facing portion 30*a* of the fixed core 30 and the second end 45 of the yoke 44. The non-magnetic pipe 14 covers the outer periphery of a gap 110 defined between the moving core 22 and the fixed core 30 in the axial direction.

The valve member 20 is in the form of a hollow bottomed cylinder to have the contact portion 21 that can be seated on the valve seat 17 formed in the valve body 16. Multiple fuel ports 20*a* are formed to extend through the sidewall of the valve member 20 in the upstream of the contact portion 21. Fuel flowing into the valve member 20 passes from the inside of the valve member 20 to the outside through the fuel ports 20*a*, so that the fuel is directed to a valve portion defined by the contact portion 21 and the valve seat 17. A clearance 102, which is larger than a slide clearance, is formed between the outer peripheral wall of the valve member 20 and the inner peripheral wall of the valve body 16.

The moving core 22 is fixed to the valve member 20 on the opposite side of the valve body 16 by welding or the like. A spring 24 serving as a bias member is latched at one end thereof on the valve member 20 and at the other end thereof on an adjusting pipe 32. The adjusting pipe 32 is press-fitted into the fixed core 30. The fixed core 30 is mounted in and fixed to the pipe member 12.

A coil 40 is wound around a bobbin 42, and is mounted on the outer periphery of the non-magnetic pipe 14. The yoke 44, which covers the outer periphery of the coil 40, is radially outwardly connected to the magnetic pipe 13 on the side of the moving core 22, and is radially outwardly connected to the non-magnetic pipe 14 on the side of the fixed core 30. A resin housing 50 covers the outer peripheries of the pipe member 12, the coil 40, and the yoke 44. A terminal 52 is electrically connected to the coil 40 to supply drive current to the coil 40.

Subsequently, an operation of the fuel injection valve 10 is described.

When the coil 40 is supplied with electric current, a magnetic field is generated in the coil 40. The magnetic field generated in the coil 40 causes magnetic flux to flow through a magnetic circuit that is formed of the yoke 44, the magnetic pipe 13, the non-magnetic pipe 14, the moving core 22, and the fixed core 30. Both the yoke 44 and the magnetic pipe 13 are made of magnetic materials, so that magnetic resistance between the yoke 44 and the moving core 22 is small. On the other hand, the non-magnetic pipe 14 is interposed between the yoke 44 and the fixed core 30. The non-magnetic pipe 14 is thin-walled, so that magnetic flux sufficiently passes between a first end 46 of the yoke 44 and the fixed core 30. Therefore, magnetic resistance between the yoke 44 and the fixed core 30 is decreased. Owing to flowing of magnetic flux through the magnetic circuit, force of magnetic attraction is generated between the fixed core 30 and the moving core 22, so that the moving core 22 is attracted toward the fixed core 30. As the moving core 22 is attracted toward the fixed core 30, the valve member 20 is moved upward in FIG. 1, so that the contact portion 21 of the valve member 20 is separated from the valve seat 17. Thereby, fuel is jetted from the jet nozzles formed in the jet nozzle plate 18.

When electric current supplied to the coil 40 is stopped, the force of magnetic attraction between the fixed core 30 and the moving core 22 disappears. As a result, the moving core 22 is moved by the bias of the spring 24 in the direction away from the fixed core 30. The valve member 20 is also moved in the direction away from the fixed core 30, that is, toward the valve seat 17. When the contact portion 21 of the valve member 20 is seated on the valve seat 17, fuel injection is shut off.

(Second Embodiment)

Figure 2:
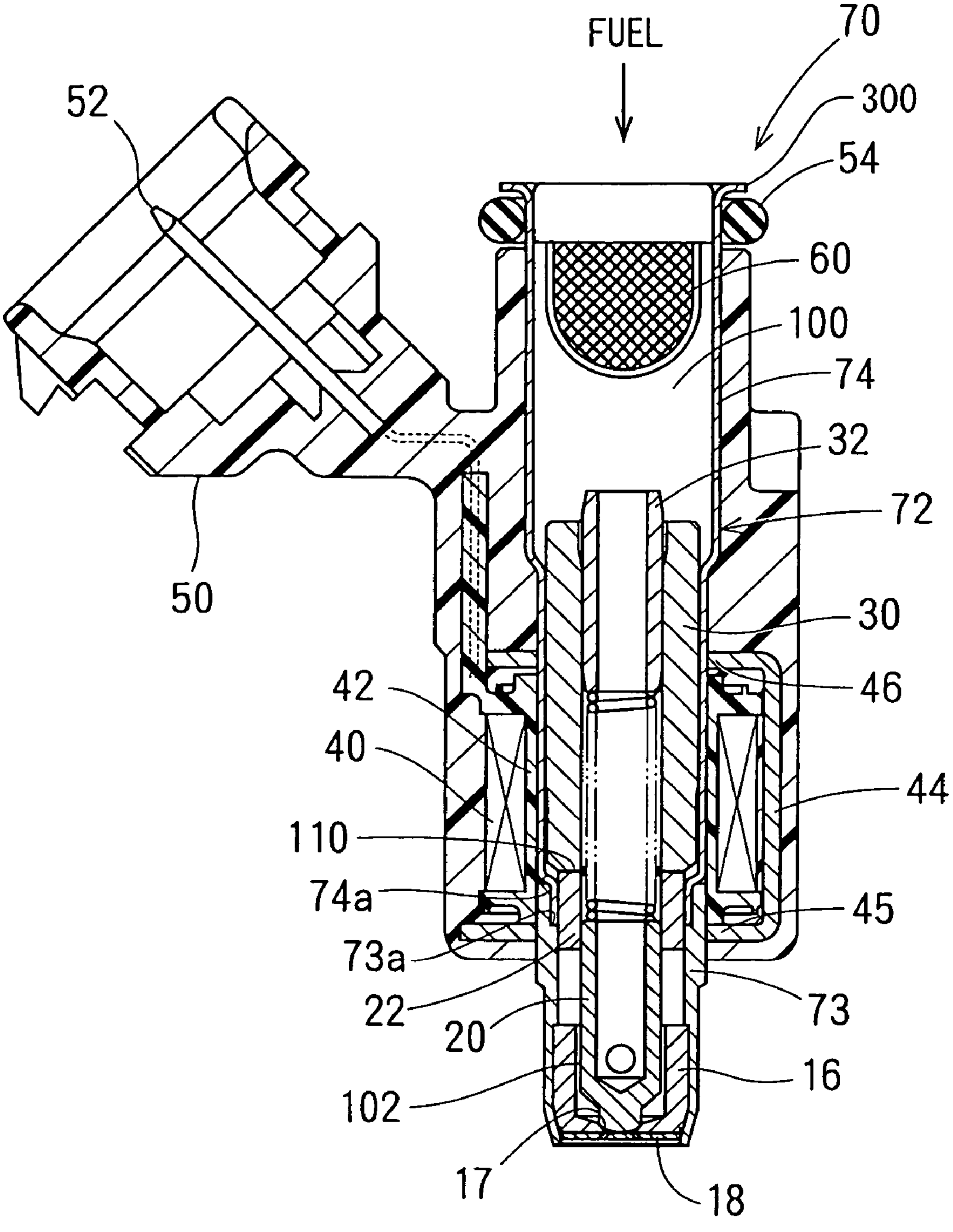
FIG. 2 is a cross sectional view showing a fuel injection valve according to a second embodiment of the present invention.

As shown in FIG. 2, a pipe member 72 of a fuel injection valve 70 includes a magnetic pipe 73 and a non-magnetic pipe 74. The magnetic pipe 73 is mounted on the side of the moving core 22, and the non-magnetic pipe 74 is mounted on the side of the fixed core 30. An inner peripheral wall of the end of the magnetic pipe 73 on the side of the non-magnetic pipe 74 is enlarged in the inside diameter, so that a step 73*a* is formed in the end of the magnetic pipe 73 on the side of the non-magnetic pipe 74. Besides, the end of the non-magnetic pipe 74 on the side of the magnetic pipe 73 is reduced in the diameter, so that a step 74*a* is formed in the end of the non-magnetic pipe 74 on the side of the magnetic pipe 73. The step 74*a* of the non-magnetic pipe 74 is fitted onto the inner periphery of the step 73*a* of the magnetic pipe 73 such that the magnetic pipe 73 and the non-magnetic pipe 74 overlap each other in the axial direction, and the non-magnetic pipe 74 covers the outer periphery of the gap 110. With this construction, the non-magnetic pipe 74 can be made radially closer to the gap 110 than the magnetic pipe 73, so that magnetic flux flowing through the gap 110 can be restricted from being short-circuited through the pipe member 72.

(Third Embodiment)

Figure 3:
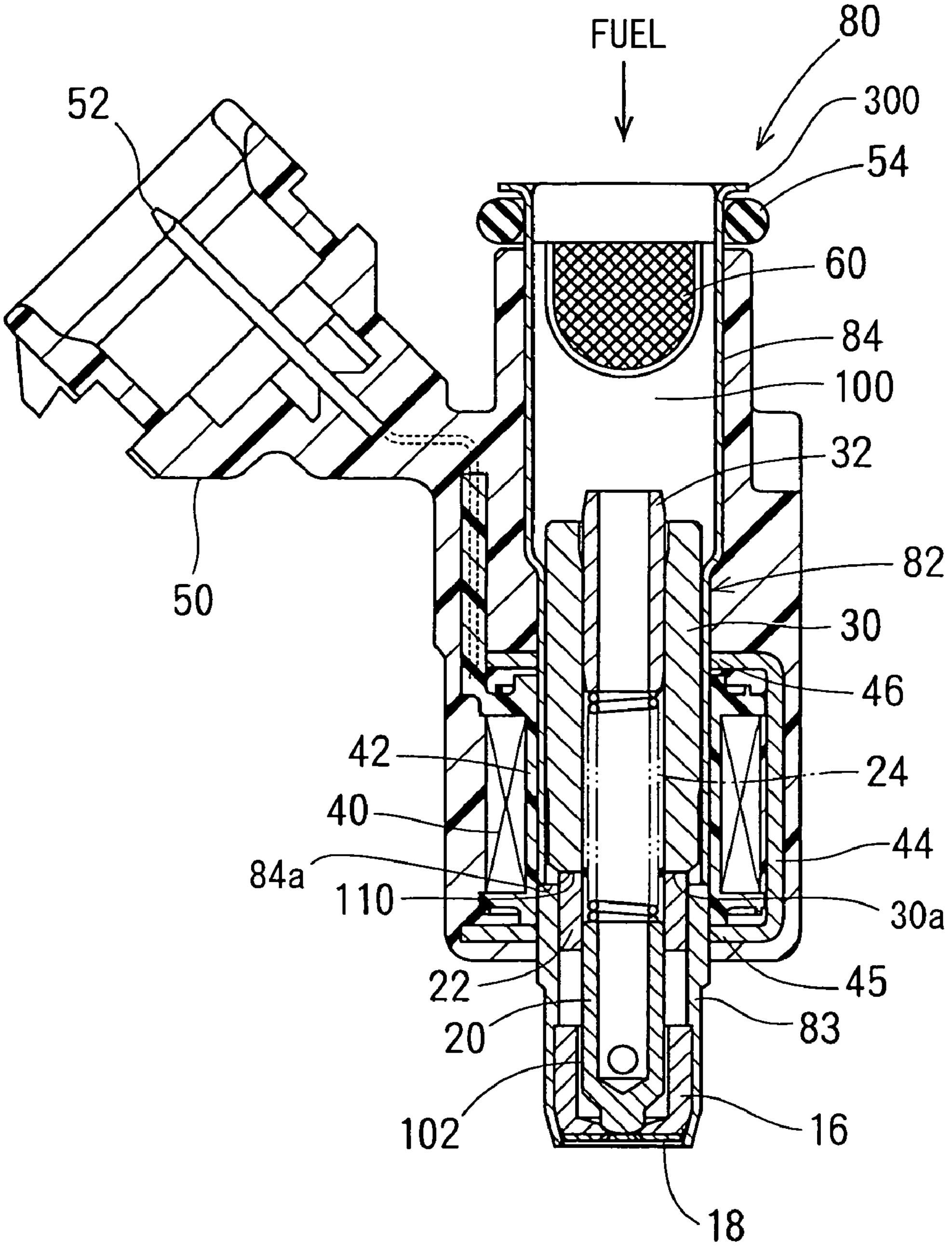
FIG. 3 is a cross sectional view showing a fuel injection valve according to a third embodiment of the present invention.

As shown in FIG. 3, a pipe member 82 of a fuel injection valve 80 includes a magnetic pipe 83 and a non-magnetic pipe 84. The magnetic pipe 83 is mounted on the side of the moving core 22, and the non-magnetic pipe 84 is mounted on the side of the fixed core 30. The non-magnetic pipe 84 has an end 84*a* on the side of the moving core 22. The end 84*a* of the non-magnetic pipe 84 is positioned between the facing portion 30*a* of the fixed core 30 and the second end 45 of the yoke 44. The magnetic pipe 83 and the non-magnetic pipe 84 are joined together such that the magnetic pipe 83 and the non-magnetic pipe 84 face to each other in the axial direction.

(Fourth Embodiment)

Figure 4:
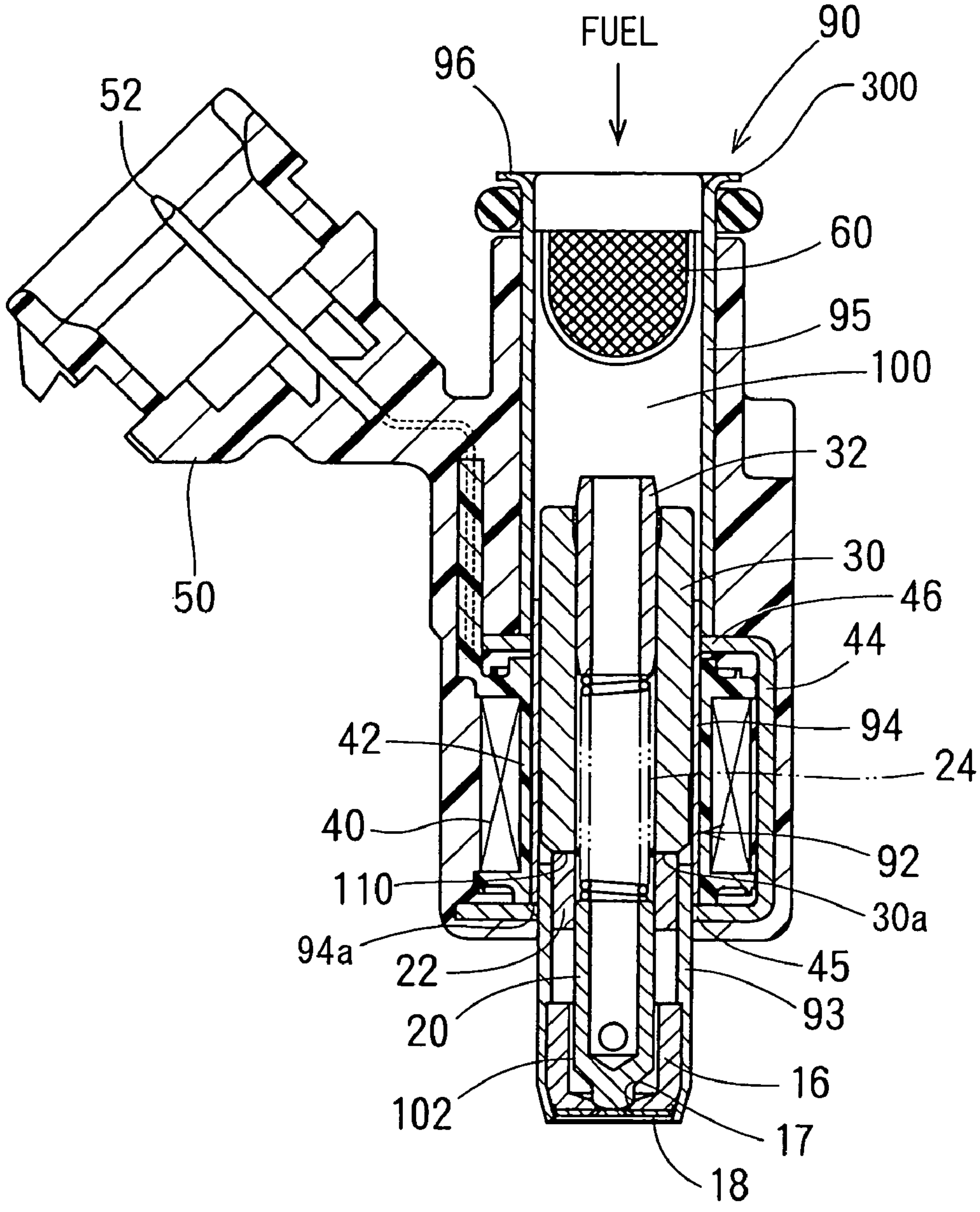
FIG. 4 is a cross sectional view showing a fuel injection valve according to a fourth embodiment of the present invention.

As shown in FIG. 4, a pipe member 92 of a fuel injection valve 90 includes a magnetic pipe 93 and a non-magnetic pipe 94. The magnetic pipe 93 is mounted on the side of the moving core 22, and the non-magnetic pipe 94 is mounted on the side of the fixed core 30. The non-magnetic pipe 94 has an end 94*a* on the side of the moving core 22. The end 94*a* of the non-magnetic pipe 94 is positioned between the facing portion 30*a* of the fixed core 30 and the second end 45 of the yoke 44. A cylindrical-shaped passage member 95 is fitted onto the outer periphery of the non-magnetic pipe 94. The passage member 95 extends to the end of the fuel injection valve 90 on the opposite side of the jet nozzle plate 18 such that the passage member 95 defines a fuel inlet 96. The passage member 95 may be formed of a magnetic material or a non-magnetic material. The passage member 95 may be formed of a material other than metal.

(Fifth Embodiment)

Figure 5:
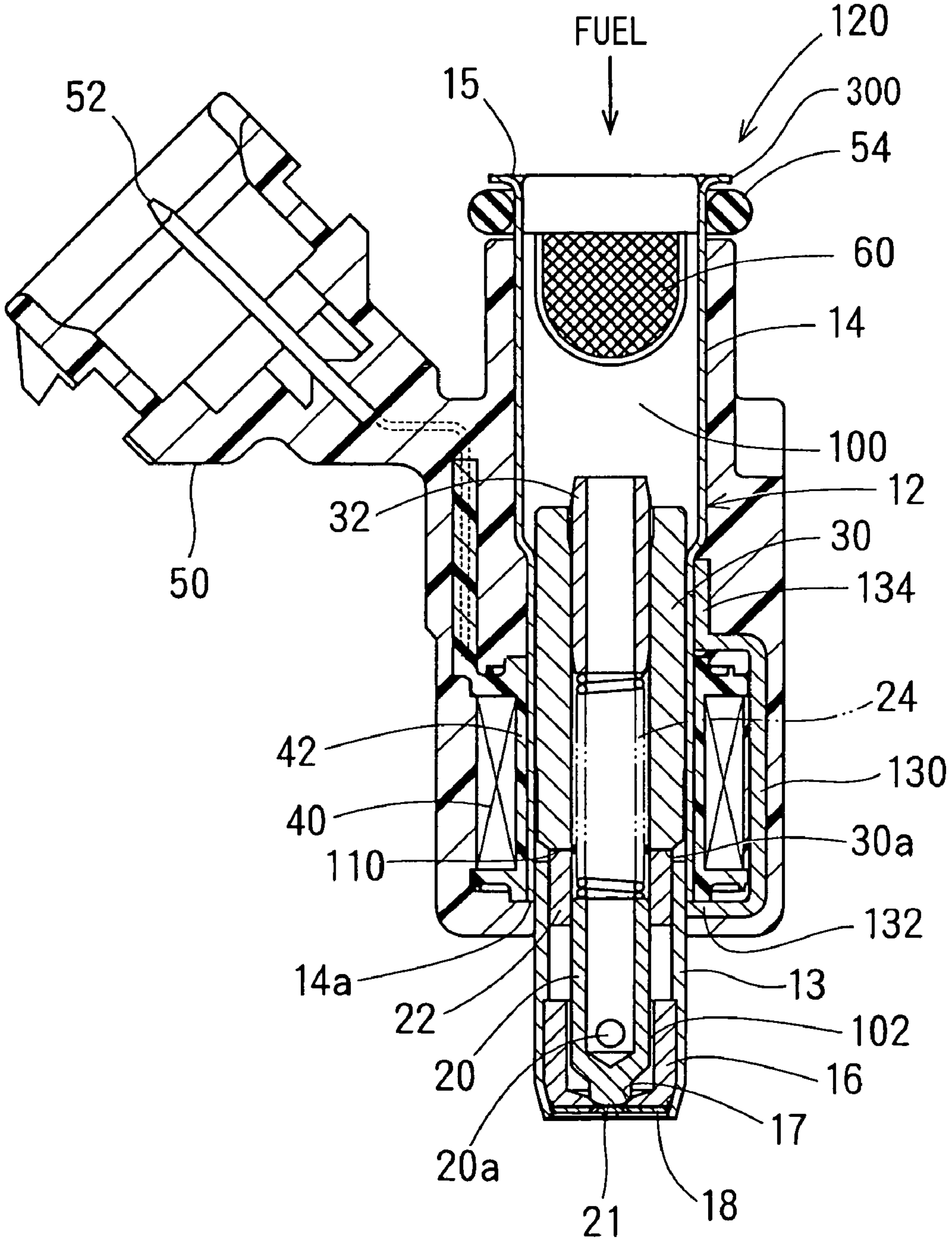
FIG. 5 is a cross sectional view showing a fuel injection valve according to a fifth embodiment of the present invention.

As shown in FIG. 5, a fuel injection valve 120 has a yoke 130 defining a first end 134, on which the yoke 130 is connected to the non-magnetic pipe 14. The first end 134 of the yoke 130 is positioned on the outer peripheral side of the fixed core 30 with respect to the non-magnetic pipe 14. The first end 134 of the yoke 130 extends axially along the outer peripheral surface of the non-magnetic pipe 14. Therefore, $S1>S2$ is established where S1 indicates the area (first connection area) of the first end 134 of the yoke 130. The yoke 130 is connected to the non-magnetic pipe 14 via the first end 134. S2 indicates the area (second connection area) of the second end 132 of the yoke 130. The yoke 130 is connected to the magnetic pipe 13 via the second end 132. That is, the first connection area S1 of the first end 134 of the yoke 130 is greater than the second connection area S2 of the second end 132. Thereby, the first end 134 of the yoke 130 makes contact with the outer periphery of the non-magnetic pipe 14 widely compared with the second end 132 of the yoke 130 relative to the magnetic pipe 13.

With this construction, magnetic flux, which flows between the yoke 130 and the fixed core 30 through the first connection area S1, increases. As a result, magnetic flux flowing through the gap 110 axially defined between the moving core 22 and the fixed core 30 increases to produce an increase in the force of magnetic attraction, so that the valve opening responsiveness is improved.

Here, the first end 134 of the yoke 130 may extend axially to at least one of both the side of the fuel inlet 15 and the side of the valve body 16.

In the above structures, the pipe member axially extends over the locations, on which the pipe member is connected to both the first and second ends 45, 132, 46, 134 that are axial ends of the yoke 44, 130. The pipe member includes two members, that is, the magnetic pipe and the non-magnetic pipe. Therefore, parts of the pipe member are reduced in the number as compared with the structure where the pipe member includes three or more members. As a result, locations, i.e., joint portions, in which parts are joined together, are decreased, so that manufacture of the pipe member becomes easy.

Besides, the end of the non-magnetic pipe on the side of the magnetic pipe is positioned between the facing portion 30*a* of the fixed core 30, which faces to the moving core 22, and the second end 45, 132 of the yoke 44, 130 on the side of the moving core 22. Therefore, the non-magnetic pipe is positioned between the second end 45, 132 of the yoke 44, 130 and the fixed core 30 in the axial direction of the pipe member. Accordingly, magnetic flux can be restricted from being short-circuited between the second end 45, 132 of the yoke 44, 130 and the fixed core 30 through the pipe member without passing through the gap 110. Accordingly, predetermined force of magnetic attraction can be generated.

Further, the non-magnetic pipe covers the outer periphery of the gap 110. Therefore, magnetic flux can be restricted from being short-circuited between the moving core 22 and the fixed core 30 through the pipe member without passing through the gap 110. Accordingly, predetermined force of magnetic attraction can be generated.

Besides, in the above structures, the non-magnetic pipe is located between the fixed core 30 and the first end 46, 134 of the yoke 44, 130. Thereby, magnetic flux flowing between the first end 46, 134 of the yoke 44, 130 and the fixed core 30 is decreased as compared with the structure where a magnetic material is present between the first end 46, 134 of the yoke 44, 130 and the fixed core 30. However, the non-magnetic pipe is small in thickness, so that magnetic flux can flow between the first end 46, 134 of the yoke 44, 130 and the fixed core 30 to generate predetermined force of magnetic attraction.

Besides, the non-magnetic pipe is mounted between the coil 40 and the fixed core 30, so that magnetic flux can be restricted from flowing between the coil 40 and the fixed core 30 through the pipe member. Thereby, electromagnetic energy, which accumulates in the fixed core and the moving core, can be restricted from becoming excessively large. As a result, electromagnetic energy accumulated in the fixed core and the moving core is rapidly decreased when electric current supplied to the coil 40 is made OFF, so that the moving core 22 is rapidly separated away from the fixed core 30 by the bias of the spring 24. Accordingly, the valve closing responsiveness is improved.

Figure 6:
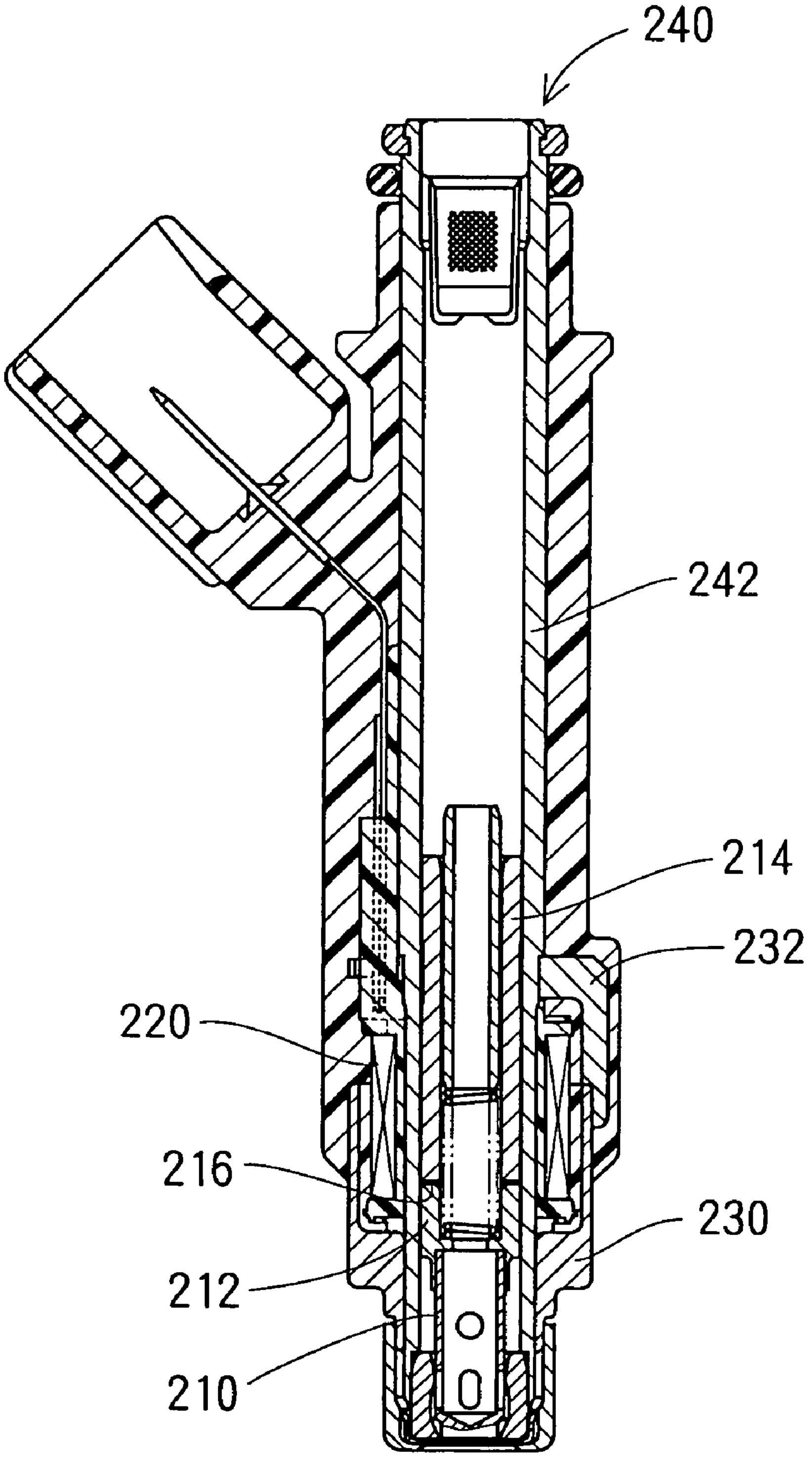
FIG. 6 RELATED ART
FIG. 6 is a cross sectional view showing a fuel injection valve of a comparative structure relative to the embodiments of the present invention.

As shown in FIG. 6, a fuel injection valve 240 has a structure comparative to the above structures relative to the first to fifth embodiments. The fuel injection valve 240 has a pipe member 242 that is a unitary member formed of a magnetic material. That is, the pipe member 242 is constructed of the unitary member that extends axially over the connection between the first yoke 230 and the second yoke 232.

With this construction, the magnetic material covers the outer peripheries of the moving core 212, the fixed core 214, and the gap 216. Accordingly, magnetic flux does not flow through the gap 216 between the moving core 212 and the fixed core 214, and magnetic flux is apt to flow through the pipe member 242 formed of the magnetic material. Thus, force of magnetic attraction, which attracts the moving core 212 toward the fixed core 214, is reduced.

Besides, the magnetic material covers all the outer peripheries of the moving core 212, the fixed core 214, and the gap 216. Accordingly, the rising and falling responsiveness of the force of magnetic attraction is degraded when electric current supplied to the coil 220 is made ON and OFF. As a result, the valve opening and closing responsiveness is lowered.

On the contrary, the pipe member 242 may be constructed of a unitary member formed of a non-magnetic material instead of a magnetic material. In this structure, magnetic flux flows through the first yoke 230 and the moving core 212 via the non-magnetic material, and magnetic flux flows through the second yoke 232 and the fixed core 214 via the non-magnetic material. Accordingly, magnetic resistance becomes large, and magnetic flux flowing through the gap 216, which is formed between the moving core 212 and the fixed core 214, is decreased. Thus, force of magnetic attraction, which attracts the moving core 212 toward the fixed core 214, is reduced.

Furthermore, when the pipe member 242 is constructed of a unitary member, the member become large in the length, and manufacture of the pipe member 242 is difficult.

By contrast, in the above structures, the non-magnetic pipe is connected to one of both the axial ends 45, 132, 46, 134 of the yoke 44, 130, and the magnetic pipe is connected to the other of both the axial ends 45, 132, 46, 134 of the yoke 44, 130. Accordingly, magnetic flux, which flows through the gap between the moving core 22 and the fixed core 30, can be restricted from being short-circuited through the pipe member. Besides, magnetic resistance of the pipe member, which is mounted among the moving core 22, the fixed core 30 and the yoke 44, 130, can be restricted from becoming excessively large. As a result, predetermined force of magnetic attraction can be obtained, so that the valve opening and closing responsiveness is improved.

Besides, two members, that is, the magnetic pipe and the non-magnetic pipe construct the pipe member that axially extends over the locations, on which the pipe member is connected to both the axial ends 45, 132, 46, 134 of the yoke 44, 130. Therefore, both the magnetic pipe and the non-magnetic pipe are made small in length as compared with the structure where a single member constructs the pipe member. Accordingly, manufacture of the magnetic pipe and the non-magnetic pipe becomes easy.

(Other Embodiments)

In the above structures, the magnetic pipe is mounted on the side of the moving core 22 and the non-magnetic pipe is mounted on the side of the fixed core 30 in the pipe member positioned axially between the locations, on which the pipe member is connected to the yoke 44, 130. However, the non-magnetic pipe may be mounted on the side of the moving core 22 and the magnetic pipe may be mounted on the side of the fixed core 30.

Besides, a position of the end of the non-magnetic pipe on the side of the magnetic pipe may axially get out of the position between the facing portion 30*a* of the fixed core 30 and the second end 45, 132 of the yoke 44, 130, as long as the pipe member positioned axially between the locations, on which the pipe member is connected to the yoke 44, 130, are constructed of two members. That is, the two members include a non-magnetic pipe and a magnetic pipe. Accordingly, the non-magnetic pipe may not cover the outer periphery of the gap 110.

Besides, in the above structure, the non-magnetic pipe is set to have the thickness of not less than 0.2 mm but not more than 1.0 mm. However, the non-magnetic pipe may have the thickness less than 0.2 mm if manufacture is possible. Besides, the non-magnetic pipe may have the thickness greater than 1.0 mm, if required force of magnetic attraction can be obtained.

In the above structure, two members, that is, the magnetic pipe and the non-magnetic pipe are located over the two locations, in which the pipe member is connected to both the axial ends, i.e., the first and the second ends 46, 134, 132, 45 of the yoke 44, 130. With this construction, parts of the pipe member, which are located over the two locations, in which the pipe member is connected to both the axial ends 46, 134, 132, 45 of the yoke 44, 130, are decreased in the number. Thus, locations, in which the parts of the pipe member are joined together, are decreased. Accordingly, manufacture of the pipe member becomes easy.

Figure 7:
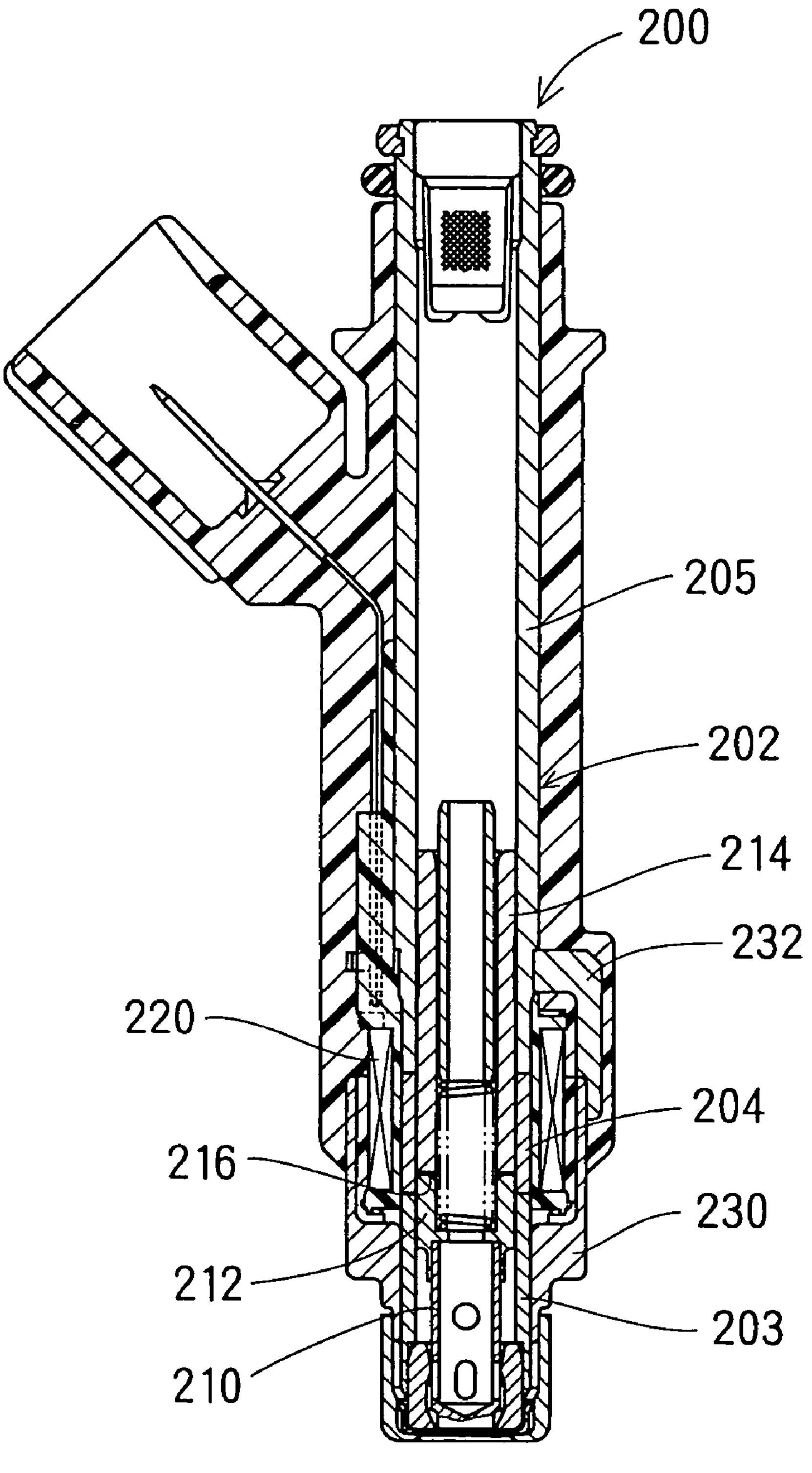
FIG. 7 PRIOR ART
FIG. 7 is a cross sectional view showing a fuel injection valve according to a prior art.

Besides, two members constructing the magnetic pipe and the non-magnetic pipe are located over the two locations, in which the pipe member is connected to both the axial ends 46, 134, 132, 45 of the yoke 44, 130. The yoke 44, 130 covers the outer periphery of the coil 40. Thereby, the area of the magnetic portions, which covers the outer peripheries of the moving core 22 and the fixed core 30, is decreased as compared with the pipe member shown in FIG. 7 and the case where all the pipe member is made of a magnetic material. As a result, magnetic flux, which is transmitted through among the coil 40, the moving core 22 and the fixed core 30 via the magnetic pipe of the pipe member, decreases. Besides, magnetic flux, which flows between the moving core 22 and the fixed core 30 through the gap 110, increases. Thus, the force of magnetic attraction is increased and the valve opening responsiveness is improved.

Besides, the area of the magnetic portions, which cover the outer peripheries of the moving core 22 and the fixed core 30, is decreased, so that the rising and falling responsiveness of the force of magnetic attraction is improved, when electric current supplied to the coil 40 is made ON and OFF. Thus, the valve opening and closing responsiveness is improved.

Besides, the magnetic path is reduced in the magnetic resistance as compared with that construction, in which all the outer peripheries of the moving core 22 and the fixed core 30 are covered with a non-magnetic material. As a result, magnetic flux flowing through the magnetic path increases, so that the valve opening responsiveness is improved.

In the above structures, the outer periphery of the gap 110 formed between the fixed core 30 and the moving core 22 is covered with the non-magnetic pipe. Thereby, magnetic flux, which flows through the gap 110, can be restricted from being partially short-circuited through the pipe member. Accordingly, force of magnetic attraction, which attracts the moving core 22, is increased.

In the above structures, the end of the non-magnetic pipe on the side of the magnetic pipe is positioned on the side of the moving core 22 relative to the facing portion 30*a* of the fixed core 30 that faces to the moving core 22. Besides, the end of the non-magnetic pipe on the side of the magnetic pipe is positioned axially on the side of the fixed core 30 relative to the second end 45, 132 of the yoke 44, 130 on the side of the moving core 22. That is, with the pipe member, the non-magnetic pipe is positioned axially between the facing portion 30*a* of the fixed core 30, which faces to the moving core 22, and the end of the yoke 44, 130 on the side of the moving core 22. Accordingly, magnetic flux is introduced through the gap 110 between the fixed core 30 and the moving core 22, and magnetic flux is restricted from being short-circuited through the second end 45, 132 of the yoke 44, 130 and the fixed core 30 via the pipe member.

In the above structures, the non-magnetic pipe is mounted on the side of the fixed core 30 to cover the outer periphery of the fixed core 30. Therefore, magnetic flux, which flows from the coil 40 directly to the fixed core 30 through the pipe member without passing through the yoke 44, 130, can be reduced. Accordingly, magnetic flux flowing through the fixed core 30 and the moving core 22 is decreased. As a result, electromagnetic energy accumulated in the fixed core 30 and the moving core 22 is decreased, so that the force of magnetic attraction, which acts between the moving core 22 and the fixed core 30 when electric current to the coil 40 is made OFF, is rapidly decreased. Accordingly, the moving core 22 is rapidly separated away from the fixed core 30 when electric current to the coil 40 is made OFF.

In the above structures, the non-magnetic pipe mounted on the side of the fixed core 30 extends to the end on the opposite side of the jet nozzle such that the non-magnetic pipe forms the fuel inlet 15, 96. Therefore, parts on the side of the fuel inlet 15, 96 of the fuel injection valve is reduced in the number. Accordingly, manufacturing cost can be reduced.

In the above structures, the opening end of the non-magnetic pipe, which defines the fuel inlet 15, 96, at least partially constructs a latch that prevents the sealing member, i.e., O-ring 54 from coming-off. Therefore, parts for prevention of coming-off of the O-ring 54 can be reduced.

Here, when the non-magnetic pipe is large in thickness, magnetic flux transmitted in the thickness direction through the location, on which the pipe member is connected to the yoke 44, 130, is decreased. Besides, the force of magnetic attraction, which acts between the fixed core 30 and the moving core 22, is decreased. The non-magnetic pipe has the thickness of 1 mm or less, so that magnetic flux for generation of required force of magnetic attraction can be caused to flow in the thickness direction of the non-magnetic pipe.

Besides, when the non-magnetic pipe is excessively small in thickness, manufacture of the non-magnetic pipe becomes difficult. The non-magnetic pipe has the thickness of 0.2 mm or more, so that manufacture of the non-magnetic pipe is made possible.

In the above structures, the non-magnetic pipe and the magnetic pipe are not butted against each other excluding the structure in the third embodiment, but are caused to overlap each other in the axial direction. Thereby, the non-magnetic pipe and the magnetic pipe can be easily joined together by welding the overlapped location between the non-magnetic pipe and the magnetic pipe.

In the above structures, the first connection area S1 of the yoke 44, 130, in which the yoke 44, 130 is connected to the non-magnetic pipe, is made larger than the second connection area S2 of the yoke 44, 130, in which the yoke 44, 130 is connected to the magnetic pipe. Magnetic flux is hard to flow through the first connection area S1 of the yoke 44, 130, in which the yoke 44, 130 is connected to the non-magnetic pipe. However, the first connection area S1 is greater than the second connection area S2, so that magnetic flux transmitted between the yoke 44, 130 and the moving core 22 or the fixed core 30 through the non-magnetic pipe is increased. Accordingly, the force of magnetic attraction is increased and the valve opening responsiveness is improved.

The structures of the above embodiments can be combined as appropriate.

Various modifications and alternations may be diversely made to the above embodiments without departing from the spirit of the present invention.

What is claimed is:

1. A fuel injection valve comprising:

a valve member that defines a jet nozzle through which fuel is intermittently injected;

a moving core that reciprocates with the valve member;

a fixed core that is mounted on an opposite side of the jet nozzle with respect to the moving core, the fixed core facing to the moving core to generate force of magnetic attraction between the fixed core and the moving core;

a pipe member that covers both an outer periphery of the moving core and an outer periphery of the fixed core, the pipe member including a magnetic pipe and a non-magnetic pipe, the non-magnetic pipe located on one of both sides of the magnetic pipe in an axial direction of the magnetic pipe, the non-magnetic pipe joined to the magnetic pipe;

a coil that is mounted on an outer periphery of the pipe member to generate force of magnetic attraction between the moving core and the fixed core by energizing; and a yoke that covers an outer periphery of the coil, wherein the yoke defines a first axial end that is connected to the non-magnetic pipe, and the yoke defines a second axial end that is connected to the magnetic pipe.

2. The fuel injection valve according to claim 1, wherein the fixed core and the moving core define a gap therebetween, and the non-magnetic pipe covers an outer periphery of the gap.

3. The fuel injection valve according to claim 1, wherein the non-magnetic pipe has an end on the side of the magnetic pipe, the end of the non-magnetic pipe on the side of the magnetic pipe is positioned on the side of the moving core with respect to a portion of the fixed core, the portion of the fixed core facing to the moving core, and the end of the non-magnetic pipe on the side of the magnetic pipe is positioned axially on the side of the fixed core with respect to one of the first axial end of the yoke and the second axial end of the yoke, the one of the first axial end of the yoke and the second axial end of the yoke positioned on a side of the moving core.

4. The fuel injection valve according to claim 1, wherein the magnetic pipe is mounted on a side of the moving core, and the non-magnetic pipe is mounted on a side of the fixed core.

5. The fuel injection valve according to claim 4, wherein the non-magnetic pipe extends to an end, which is on an opposite side of the jet nozzle, to define a fuel inlet.

6. The fuel injection valve according to claim 5, further comprising:

a sealing member that is fitted onto an outer periphery of the fuel inlet of the non-magnetic pipe, wherein the non-magnetic pipe defines an opening end that forms the fuel inlet, the opening end of the non-magnetic pipe extending radially outward to form at least a part of a latch, the latch preventing the sealing member from coming-off the non-magnetic pipe.

7. The fuel injection valve according to claim 1, wherein the non-magnetic pipe has thickness that is equal to or less than 1 mm.

8. The fuel injection valve according to claim 7, wherein the non-magnetic pipe has thickness that is equal to or greater than 0.2 mm.

9. The fuel injection valve according to claim 1, wherein the non-magnetic pipe and the magnetic pipe axially overlap with each other.

10. The fuel injection valve according to claim 1, wherein the yoke defines a first connection area in which the yoke is connected to the non-magnetic pipe, the yoke defines a second connection area in which the yoke is connected to the magnetic pipe, and the first connection area is greater than the second connection area.

11. The fuel injection valve according to claim 10, wherein the first axial end of the yoke defines the first connection area between the yoke and the non-magnetic pipe in the radial direction of the yoke, and the second axial end of the yoke defines the second connection area between the yoke and the magnetic pipe in the radial direction of the yoke.

12. The fuel injection valve according to claim 11, wherein the first axial end of the yoke extends along an outer peripheral surface of the non-magnetic pipe in an axial direction of the non-magnetic pipe.

* * * * *